UNITED STATES PATENT OFFICE.

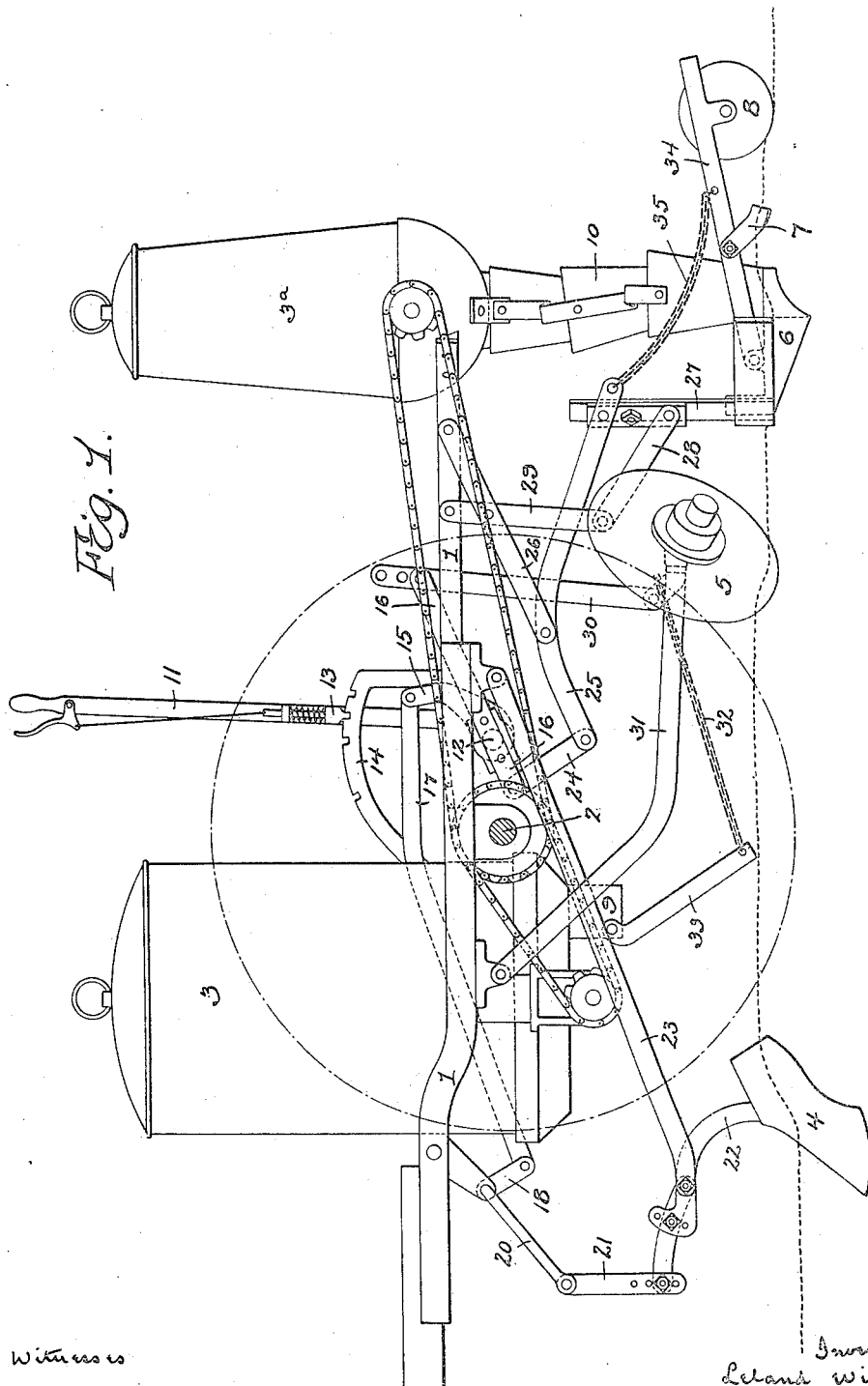

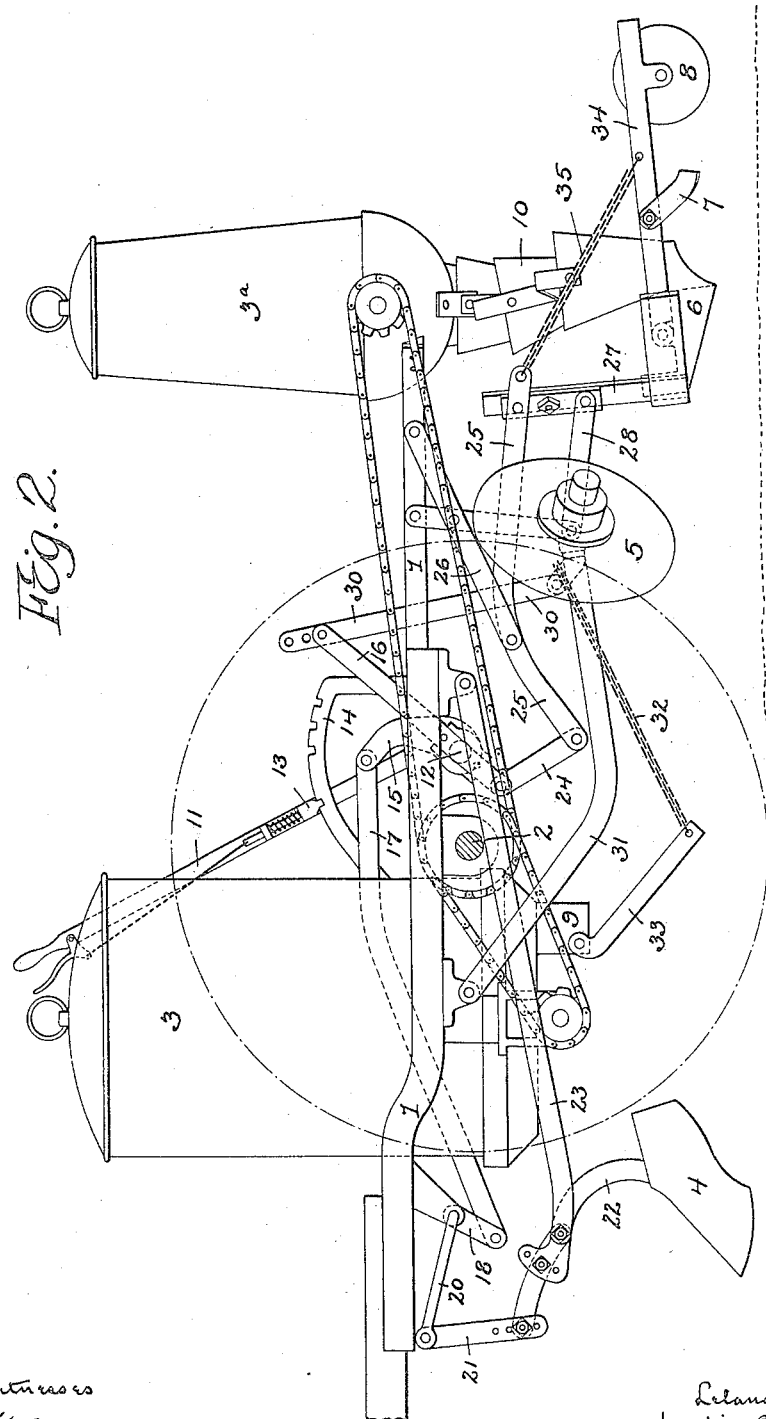

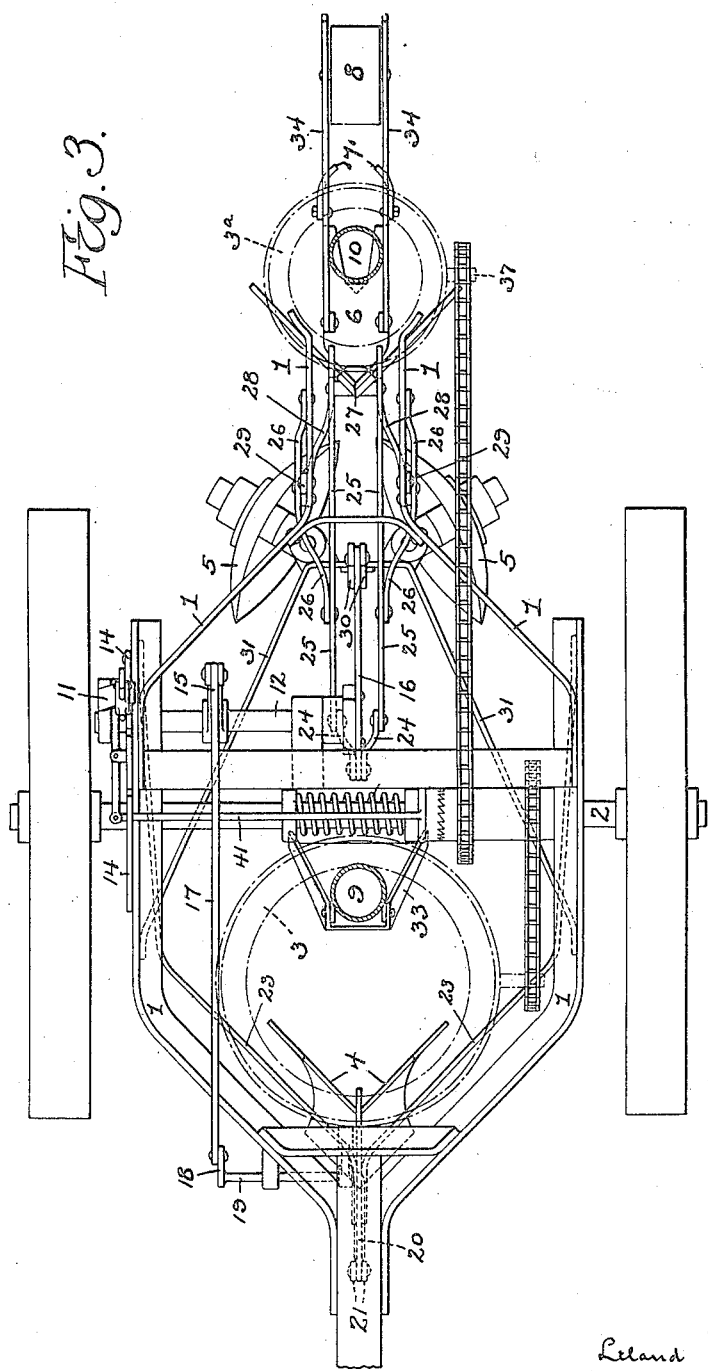

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

COMBINED FERTILIZER AND SEED-PLANTER.

1,253,759.   Specification of Letters Patent.   Patented Jan. 15, 1918.

Application filed July 9, 1914. Serial No. 849,901.

*To all whom it may concern:*

Be it known that I, LELAND WILLIS, a citizen of the United States, residing in Grenloch, New Jersey, have invented certain Improvements in Combined Fertilizers and Seed-Planters, of which the following is a specification.

My invention relates to that class of combined fertilizers and seed planters in which both the fertilizing and seed dropping devices are combined with a preceding plow and a following furrow coverer, my invention comprising means for supporting said plows and furrow coverers so as to effect raising and lowering of the entire set by the operation of a single lever.

In the accompanying drawings

Figure 1 is a side view of a seed planter constructed in accordance with my invention, the parts being in the lowered or operative position;

Fig. 2 is a view similar to Fig. 1 but showing the parts in the elevated or inoperative position; and Fig. 3 is a plan view of the machine with the parts in the position shown in Fig. 1.

In Figs. 1 and 2 the wheels are removed from the machine but the outline of the wheels is represented by dotted lines, and in Fig. 3 the fertilizer and seed hoppers are represented only by dotted lines, and certain chain connections are omitted in order to prevent confusion.

In the drawing, 1—1 represent the fixed side frames of the machine which have bearings for the wheeled axle 2 upon which the machine is mounted, 3 represents the fertilizer hopper and 3ª the seed hopper (both fixedly mounted upon the side members 1 of the fixed frame), 4 the plow for forming the first furrow, 5 the disks which act to cover or close the same after the fertilizer has been deposited therein, 6 the plow following in the wake of the blades 5 and serving to open a second furrow in the top of the previously formed and closed furrow, 7 the covering blades for said second furrow, and 8 a roller which follows the covering blades 7 and serves to flatten or compress the seed-covering ridge turned up by said blades, 9 the delivery spout of the fertilizer hopper and 10 the telescopic delivery spout of the seed hopper, all of these parts being similar in construction and operation to those of machines at present in use and hence being only incidentally included in my invention, which relates more particularly to the means for supporting the furrow forming and closing devices and for lowering them into operative position or raising them to inoperative position by movement of one and the same lever.

This lever is represented at 11 and is connected to a shaft 12, mounted so as to be free to turn in bearings on the fixed frame, the lever, by preference, being provided with a locking bolt 13 which engages one or other of a series of notches in a curved bar 14 so as to retain the lever in the different positions to which it may be adjusted.

The shaft 12 is provided with an arm 15 and has at its inner end a lever 16. The arm 15 is connected by a link 17 to an arm 18 on a rock shaft 19, the latter being mounted in suitable bearings on the fixed frame and having another arm 20 which is connected by links 21 to the forward end of the draft beam 22 of the plow 4, the latter being suspended from the fixed side bars 1 by means of pivoted arms 23.

The forward arm of the lever 16 is connected by links 24 to the forward ends of levers 25 which are pivotally mounted upon the lower ends of links 26, the latter being connected at their upper ends to the side frames 1 of the machine. The rear ends of the levers 25 are pivotally connected to a standard 27 projecting upwardly from the front end of the plow 6, and to said standard are also pivotally connected links 28 pivotally mounted upon the lower ends of links 29 carried by and depending from the side frames 1 of the machine, the links 26 and 29 being connected where they cross so as to mutually brace one another. The rear arm of the lever 16 is connected by links 30 to the rear end of a forked frame 31 which is pivoted at its forward end to suitable bearings on the fixed side bars 1, and carries at its rear end the furrow-covering disks 5, said frame being also connected by a chain 32 to the directing trough 33 which acts in conjunction with the discharge spout 9 of the fertilizer hopper.

The furrow coverers 7 and flattening roller 8 are mounted upon arms 34 which are pivotally mounted at their front ends upon some portion of the plow structure 6 and are connected by chains 35 to the rear ends of the levers 25.

When the lever 11 is in the position shown in Fig. 1, the operating parts 4, 5, 6, 7 and 8 are in the lower or operative position shown in said Fig. 1, but by moving the lever to the position shown in Fig. 2 all of said parts 4, 5, 6, 7 and 8 will be simultaneously moved to the elevated or inoperative position shown in said Fig. 2, the arm 15 acting to lift the beam 22 of the plow 4, the rear arm of the lever 16 acting to lift the furrow-covering or closing blades 5, and the forward arm of said lever 16 acting to lift the plow 6 and the arms 34 which carry the covering blades 7 and the flattening roller 8.

As the lower end of the telescopic seed spout 10 is connected to some portion of the structure of the plow 6 said spout will automatically collapse as the plow is raised and by reason of the chain connection 32 the lower end of the fertilizer feed trough 33 is lifted simultaneously with the raising of the furrow-covering disks 5.

I claim:

1. The combination, in a combined fertilizer and seed planter, of a wheeled frame, fertilizer and seed droppers mounted thereon one in advance of the other, a furrowing plow in advance of the fertilizer dropper, a furrowing plow in advance of the seed dropper, furrow covering devices in the rear of the forward plow and ahead of the rear plow, arms hung to the wheeled frame and carrying the forward furrowing plow, arms hung to the said frame and carrying said covering devices, links pivoted to the frame at their upper ends, levers carrying the rear plow and pivotally mounted at the lower ends of said links, a shaft having a projecting arm and a lever mounted thereon, links connecting one arm of said lever to the arms which carry the furrow coverers, links connecting the other arm of said lever to the levers upon which the rear furrowing plow is mounted, a rock shaft pivotally mounted on the frame adjacent to the forward furrowing plow, said rock shaft having two arms, a link connection between one of said arms and said plow, and a link connection between the other of said arms and the arm on the main shaft.

2. The combination, in an implement of the character described, of the wheeled frame, the rear furrowing plow, carrying levers therefor, links pivoted at their upper ends to said main frame and having said carrying levers pivoted to their lower ends, and a bracing attachment for said plow support comprising upper and lower pairs of links pivotally connected together at their meeting ends, pivotal connections between the rear ends of the lower links and the plow structure, pivotal connections between the upper ends of the upper pair of links and the frame, and pivotal connections between said upper pair of links and the links which support the plow carrying levers, said latter connections being at points intermediate of the ends of said supporting links.

In testimony whereof, I have signed my name to this specification, in the presence of two subscribing witnesses.

LELAND WILLIS.

Witnesses:
E. R. CRABB,
B. FRANKLIN CHASE.

Copies of this patent may be obtained for five cents each, by addressing the "Commissioner of Patents, Washington, D. C."